March 9, 1926.
J. W. MATTHEWS
GATE
Filed Dec. 26, 1924
1,576,442
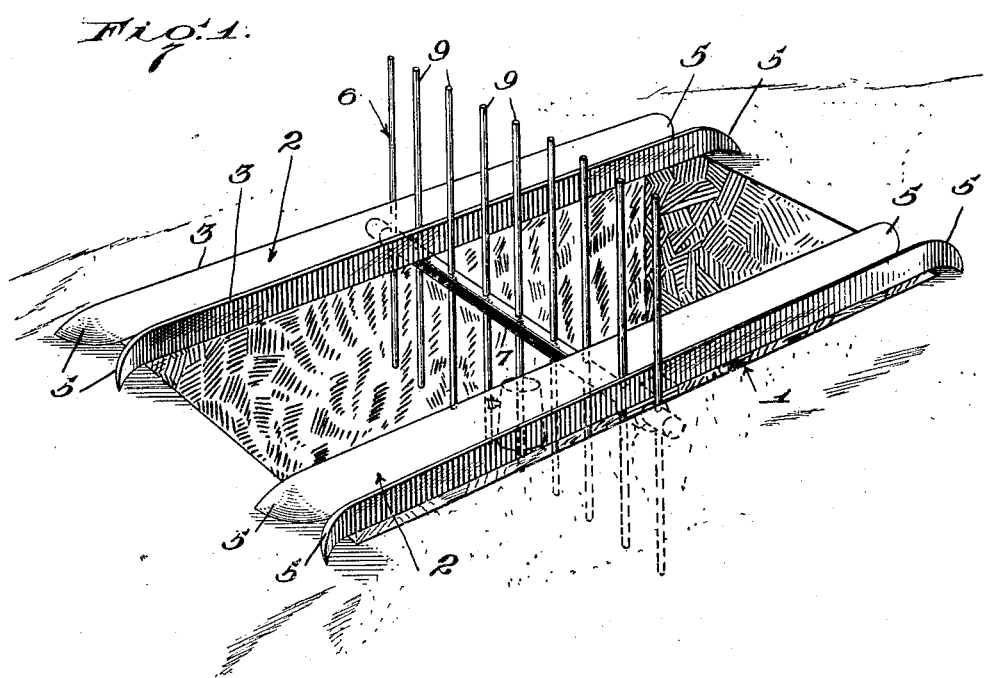
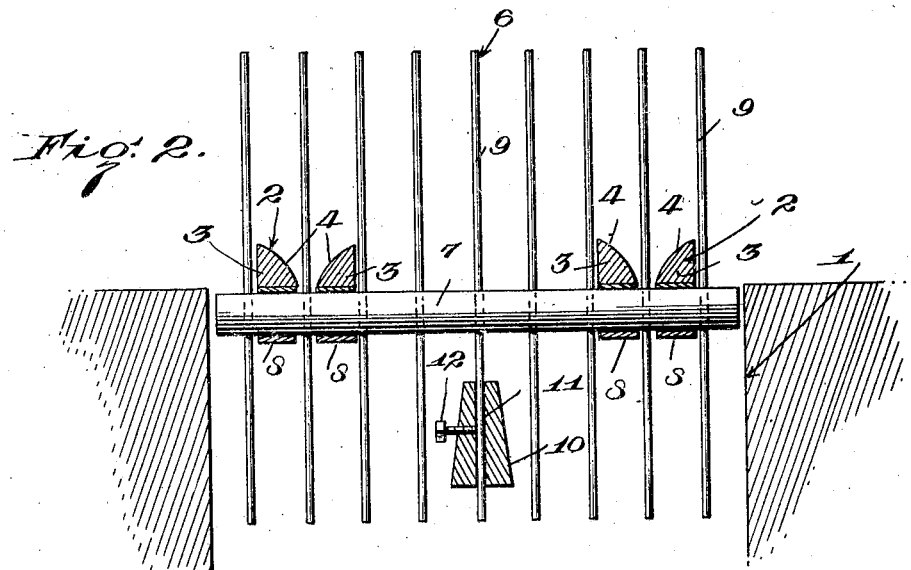
WITNESSES
INVENTOR
J. W. Matthews
BY
ATTORNEYS Patented Mar. 9, 1926.

1,576,442

UNITED STATES PATENT OFFICE.

JOSEPH WILLIAM MATTHEWS, OF MENARD, TEXAS.

GATE.

Application filed December 26, 1924. Serial No. 758,225.

*To all whom it may concern:*

Be it known that I, JOSEPH W. MATTHEWS, a citizen of the United States, and a resident of Menard, in the county of Menard and State of Texas, have invented certain new and useful Improvements in Gates, of which the following is a specification.

This invention aims to provide a gate of novel construction and especially designed for use with automobiles or trucks, the gate being automatically operable by the truck or automobile, to permit the truck or automobile to pass through the gate and being automatically closed after the passage of the automobile or truck.

A further object of the invention resides in the provision of a gate having these advantages and capacities and which is of simple and durable construction, safe, reliable and effective in operation, and easy and comparatively inexpensive to manufacture and install.

Other objects and advantages of the invention reside in certain novel features of the construction, arrangement and combination of parts which will be hereinafter more fully set forth and particularly pointed out in the appended claims, reference being had to the accompanying drawings forming a part of this specification, and in which:

Figure 1 is a perspective view showing one embodiment of the invention; and

Figure 2 is a view in central transverse section of the gate shown in Figure 1, parts being shown in elevation for the sake of illustration.

Referring to the drawings it will be seen that the gate constituting the present invention is used in conjunction with a pit 1 which may be covered or not, as found desirable.

Runways 2 are provided for the wheels of the automobile or truck for use with which the gate is designed and these runways 2 extend along the sides of the pit. Of course the runways are spaced so as to receive the wheels of the automobile or truck. Each runway includes a pair of spaced rails 3 having inwardly beveled surfaces 4 and having flaring ends 5 which serve as guides for the wheels of the automobile and make it easier for the driver to run the wheels of the automobile into the runways.

The gate proper is designated generally at 6 and includes a shaft 7 rotatably mounted in bearings 8, the latter being fixed on the undersides of the central portions of the rails 3. A plurality of rods 9 are fitted and secured in openings provided therefor in the shaft 7. In the arrangement shown the rods extend for equal distances on the opposite sides of the shaft 7.

Means is provided for yieldably holding the gate 6 in such position that its rods 9 are upright or vertical to block the way which the gate controls. The means comprises a weight 10 having an opening 11 designed to slidably receive the lower end of one of the rods 9. The weight 10 is held in adjusted position on its rod 9 by means of a set screw 12.

With this arrangement when an automobile runs along the rails 3 it strikes the upwardly extending portions of the rods of the gate. In order to facilitate this operation one of the rods 9 extends up through the space between each pair of rails 3 that is, one rod 9 is located in each runway 2. The rods located in the runway are engaged by the front wheels of the automobile to swing the gate from a vertical to a substantially horizontal position so as to permit the automobile to pass along the runways. Of course any part of the automobile is cooperable with the upwardly projecting portions of the rods 9 to swing the gate to a substantially horizontal position. As soon as the automobile or truck has passed the gate the gate is returned to a vertical position by the action of the weight 10 which yieldably resists movement of the gate away from the vertical and which tends to maintain the gate in a vertical position. Of course the gate is operable from either direction with equal effectiveness.

The pit 1 may be left open as shown in the drawings or may be partially or completely covered and if completely covered will have to have suitable slots to accommodate the rods 9.

I claim:

1. In combination, a pair of runways comprising spaced rails having inwardly beveled confronting surfaces and having flaring ends, a gate, means for mounting the gate on the runways, and yieldable means for holding the gate in a vertical position.

2. In combination, a pair of runways, comprising a pair of spaced rails, a gate including a shaft, means for mounting the shaft on the spaced rails, a plurality of rods carried by the shaft and projecting on the opposite sides thereof, certain of said rods extending between the spaced rails of the runway, and means for yieldably holding the gate with the rods in a vertical position.

3. In combination, a pair of runways having openings in their bottoms, a gate including a horizontal shaft, means for mounting the shaft for turning movement, and a plurality of rods carried by the shaft and projecting on the opposite sides of the shaft, said rods constituting the body of the gate, certain of said rods extending up through the openings of the runways, and means for yieldably holding the rods in vertical position.

JOSEPH WILLIAM MATTHEWS.